INVENTORS
Justin D. Hill and
Dean J. Cain.
BY Fishburn and Gold
ATTORNEYS.

Feb. 13, 1962   J. D. HILL ET AL   3,021,252
PROCESS OF MAKING WAX-CONTAINING PAPER USING WASTE WAX PAPER
Filed March 31, 1960   2 Sheets-Sheet 2
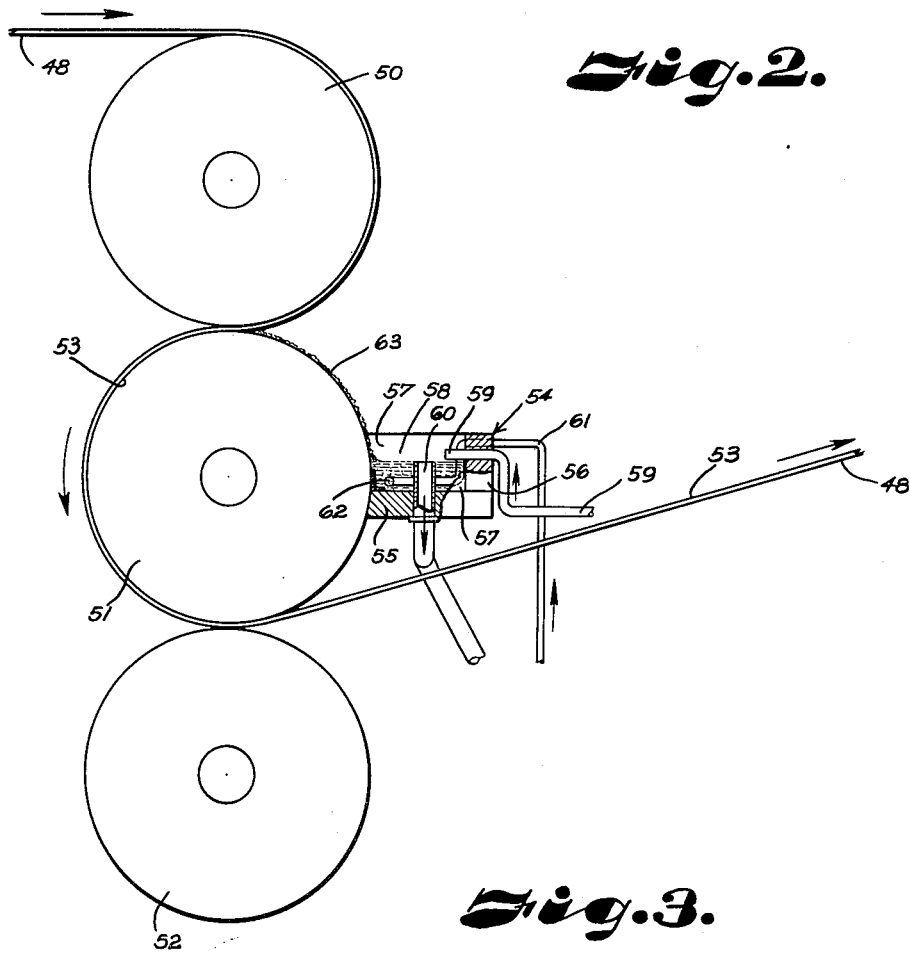
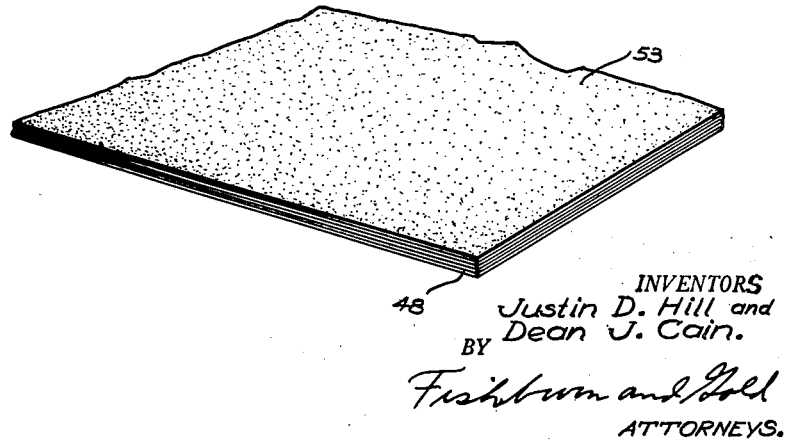
INVENTORS
Justin D. Hill and
BY Dean J. Cain.
ATTORNEYS.

Patented Feb. 13, 1962

3,021,252
PROCESS OF MAKING WAX-CONTAINING PAPER USING WASTE WAX PAPER
Justin D. Hill and Dean J. Cain, Lawrence, Kans., assignors to The Lawrence Paper Company, Lawrence, Kans., a corporation of Kansas
Filed Mar. 31, 1960, Ser. No. 18,963
5 Claims. (Cl. 162—7)

This invention relates to manufacture of paper such as water-repellant paper for use both in packaging materials and as outer liners of corrugated fiberboard for shipping containers and the like, and more particularly to a novel wax- and resin-containing paper and the process of making same utilizing waste wax paper.

In the manufacture of paper drinking cups, various paper food containers and the like, suitable mineral or other wax or synthetic resins such as vinyls, polyethylenes and the like have been used as coatings to make same water-repellant. The conversion of such coated papers into various containers and the like results in accumulation of considerable waste. Various attempts have been made to reuse this waste in making other papers, but generally without success, as the wax on the paper waste would be set free during subsequent processing and the finished paper would show evidences of wax spots and other deformities in the paper surface. Also, the other papers made from the wax paper waste had such a slick surface that it could not be printed satisfactorily, and the products would slip one on another, making them difficult to handle, stack or transport. As the result of these difficulties. wax paper waste usually has been destroyed or sold as cheap padding or packing material.

The principal objects of the present invention are to provide an improved method of handling and processing wax paper waste during the making of paper which will eliminate or minimize the difficulties abovementioned, and thereby produce a paper or paperboard of improved moistureproof qualities; to provide a multi-ply paperboard with outer laminations made of wax-containing paper waste and other laminations of paper fibers for strength; to provide such a paper with a treated outer surface for improved printing characteristics and slip resistance; and to provide a novel wax- and resin-containing paper that is moisture-resistant and a process for economically producing such paper and maintaining substantial uniformity thereof and treating same for satisfactory printing and slip-resistant qualities.

Other objects and advantages of this invention will become apparent from the following description taken in connection with the accompanying drawings, wherein are set forth by way of illustration and example certain embodiments of this invention.

FIG. 2 is an enlarged diagrammatic view of apparatus for treating the paper to improve the slip-resistant qualities thereof.

FIG. 3 is a fragmentary perspective view of a five-ply paperboard made in accordance with the present invention.

Figure 1:
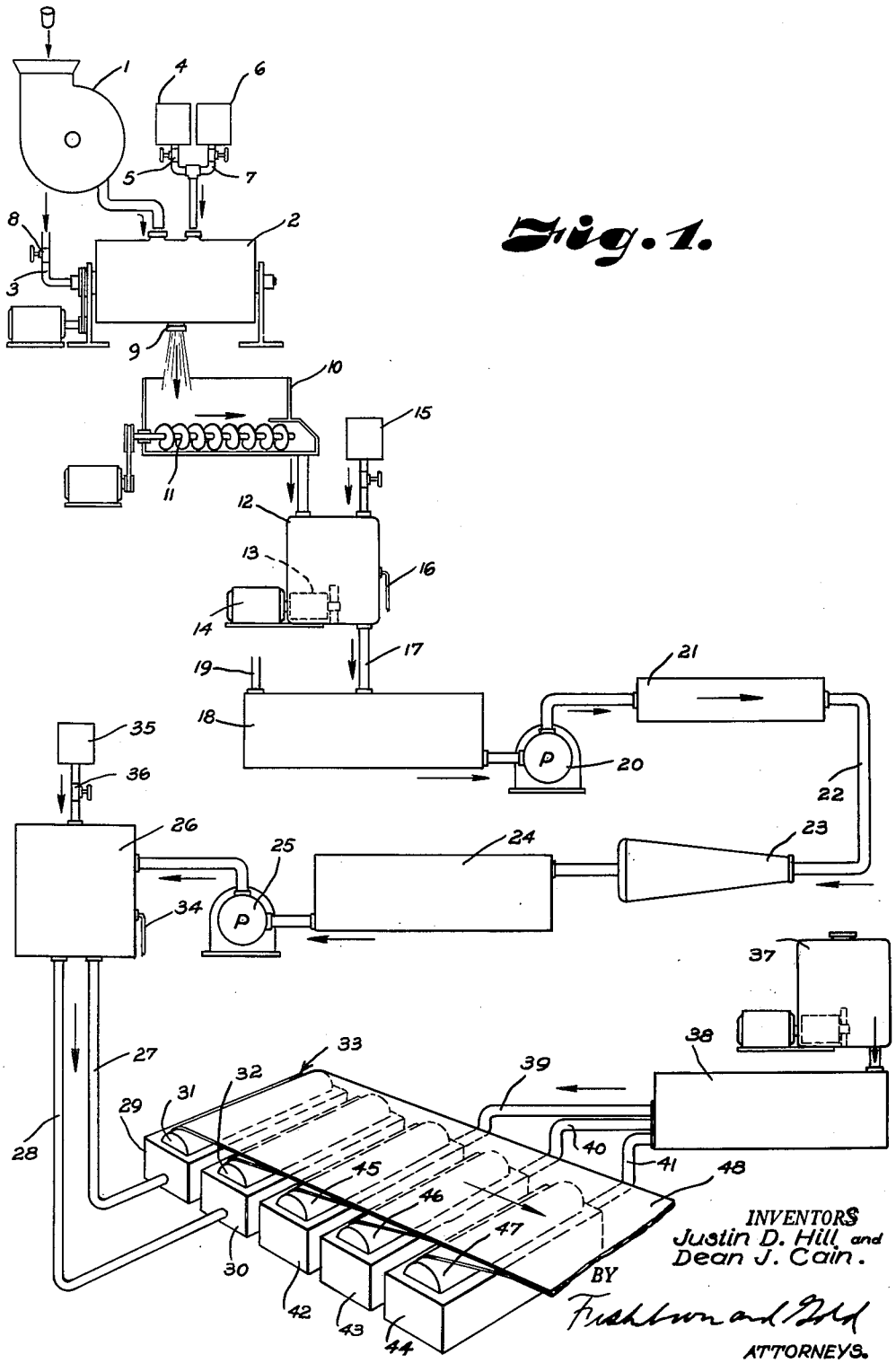
FIG. 1 is a diagrammatic view of apparatus for making wax- and resin-containing paper in accordance with the present invention.

Referring more in detail to the drawings:

Referring to FIG. 1, there is illustrated one embodiment of the invention wherein the apparatus is indicated diagrammatically involving the production of multi-ply paperboard. Whereas the invention will be described with respect to a process involving the use of wax- and resin-coated paper waste and in connection with cylinder machines, it will be readily apparent as the disclosure progresses, that certain of the novel principles set forth herein may be equally applicable to other papermaking processes and other web-forming equipment in the making of paper of any desired number of plies.

In the making of a multi-ply paperboard, for example, a five-ply paperboard with three plys or layers from usual paper fibrous pulp and two outer plys for wax- and resin-containing fibrous pulp, wax- and resin-coated paper waste such as waste paper drinking cups is fed to a hammermill 1, preferably having a screen with openings of from ¼-inch to 2 inches in diameter. The hammermill is operated to shred and grind the wax- and resin-coated waste to form a fibrous pulp which is delivered or changed into a rotary 2 of large capacity in batches. The wax- or resin-coated waste, such as used for paper cups and food containers and the like, is usually of bleached sulphate paper but commonly has printing thereon. Some of the paper waste has resin coating, the resin on some waste being a polyvinylchloride film and on other waste a polyethylene film. Other paper waste is wax coated. It is preferable that the fibrous material charged in the rotary 2 be proportioned wherein the resin is approximately one percent by weight of the charge and that the wax be approximately eight percent by weight of the charge. It has also been found that suitable results are obtained when only wax-coated waste is utilized and that the wax content may be from six to twelve percent by weight of the charge in the rotary. It is preferred that if any resin-coated waste is used, the resin in the charge in the rotary be not more than two percent by weight, and that the wax content be reduced proportionately.

After the rotary 2 is charged with the fibrous waste pulp, suitable chemicals are added thereto to provide a bleach, and then a suitable quantity of water is introduced into the rotary to form an aqueous mixture, and the rotary closed and started in operation. Then, live steam is introduced through a duct 3 to heat the pulp in said rotary. It has been found that a suitable charge for the rotary is approximately 6,000 pounds of pulp, 15 pounds of tetra sodium pyro phosphate, 60 pounds of soda ash, 120 pounds of sodium hydrosulphite. This is approximately .25 percent tetra sodium pyro phosphate, 1 percent soda ash and 2 percent sodium hydrosulphite, or a total of 3.25 percent of the pulp charge, the proportions being by weight. These chemicals are preferably contained in a hopper 4 and delivered through a valve controlled conduit 5 to the interior of the rotary. While the proportions of the chemicals given are preferred, other suitable bleach materials may be utilized and in quantities conventional in the industry, and the quantities may be varied as, for example, the total of the bleach ingredients may be varied from 2 percent to 4 percent of the charge of pulp, and a satisfactory product produced. Water from a suitable source of supply 6 is charged in the rotary to form the aqueous mixture through a valve controlled duct 7, the water preferably being in a quantity of approximately ⅓-gallon for each pound of pulp, and for a 6,000 pound charge of pulp, 2,000 gallons of water would be introduced into the rotary. The steam delivered through the duct 3 is preferably at approximately 20 pounds, and is delivered to the rotary during its operation until the paper pulp therein is heated to a temperature of between 140 and 160 degrees F. After the temperature of the pulp in the rotary reaches the desired temperature as, for example, 155 degrees F., the valve 8 is closed to turn off the steam, and the rotary is continued in operation for approximately one hour. Then the rotary is stopped and is held stationary with the fibrous pulp therein for approximately one hour. These times may be varied, but preferably is of such duration that the chemicals have time to satisfactorily bleach the pulp. The bleaching of the fibrous pulp is usually desired because the waste paper stock has varying amounts of printing thereon and the ink would cause the product to vary in color. Also, more effective bleaching is obtained when the smaller screens are used in the hammermill 1 for grinding the waste paper stock.

When the operation in the rotary is completed, a draw-off 9 of the rotary is opened, and the paper stock or pulp is dumped or otherwise delivered to a pit 10 from which it is moved by a conveyor or auger 11 in suitable batches to charge a beater 12. The beater 12 is generally of conventional construction, including a beater roll 13 driven by a suitable motor 14. When the beater 12 is charged with a batch of the fibrous stock, suitable chemicals from a source of supply 15 are introduced into the beater, said chemicals preferably being .3% to 1% paper sizing agent such as mersize, which is a viscous liquid consisting of 50% alkaline water solution of a resin containing 3 active carboxyl groups mixed with rosin, and 2% to 4% finely ground diatomaceous earth, and preferably of a proportion of .625 percent mersize and 2.75 percent diatomaceous earth, the proportions being by weight relative to the dry weight of the fibrous pulp charged to the beater. Suitable heat is applied to the beater, as by a steam line 16, to heat the pulp or stock during operation of the beater. It is preferable that the stock in the beater be heated above the melting point of the wax as, for example, if the melting point of the wax is approximately 155 degrees the stock in the beater should be heated to approximately 160 to 180 degrees.

Operation of the beater further disintegrates the paper pulp and thoroughly mixes the chemicals with the paper stock, and also the wax and resin, if any, is mixed uniformly throughout the fibrous pulp. After suitable mixing in the beater as, for example, 30 minutes to one hour, aluminum sulphate of a quantity of 3 to 7% and preferably of a quantity of approximately 5.5 percent of the dry weight of the fibrous pulp in the beater is added to the beater and mixed in the paper pulp for approximately ten minutes to aid in setting the wax in the fibers of the pulp. After approximately ten minutes of mixing, subsequent to the addition of the aluminum sulphate, the fibrous stock in the beater is dumped through a flow duct 17 to a chest 18 where additional water may be added from a suitable source of supply through a duct 19, if desired. Any water added to the paper stock in the beater or in the chest 18 is preferably hot water of a temperature of 160 to 180 degrees F. The paper stock and water is pumped from the chest 18 by a pump 20 and forced through a run box 21 and then through a duct 22 to a Jordan 23, the pulp being further refined in the Jordan. From the Jordan, the fibrous pulp is discharged into a chest 24 and then pumped by a pump 25 from the chest 24 and delivered to a head box 26 from which the fibrous pulp and water flows through ducts 27 and 28 to vats 29 and 30 respectively of cylinders 31 and 32 of a papermaking machine 33.

In the head box 26, heat is applied as by steam line 34 to maintain the temperature of the fibrous pulp in the head box between 150 and 180 degrees F. Also, a suitable foam reducer is flowed from a source of supply 35 through a valve controlled connection 36 to the head box to eliminate or reduce the foam in the fibrous material in said head box.

The two cylinders 31 and 32 of the papermaking machine 33 are used in forming the outer layers of the five-ply board, and the flow to the vats of the cylinders may be controlled by any of the well known means such as a gate valve (not shown) in the conduit between the head box and the vats. A separate beater 37 supplies fibrous pulp to a second stock chest 38 in the conventional manner from which the usual fibrous pulp flows through ducts 39, 40 and 41 to supply the vats 42, 43 and 44 of cylinders 45, 46 and 47 respectively to form the inner layers or plys of a paper web or sheet 48 formed by the papermaking machine. The numbers of cylinders and layers in the sheet may be varied for different thicknesses thereof. The cylinders 31, 32, 45, 46 and 47 are conventional and operate in a conventional manner wherein fibrous pulp is picked up in layers by the wet felts and said layers, in the course of their travel, are formed into a single sheet and the papermaking operation following the formation of the layers of fibrous material on the cylinders involves standard practices with the usual presses and dryers. The temperature of the drying rolls varies from about 220 degrees F. at the wet end to about 316 degrees F. at the dry end, and the speed of the paper in this process is related to the temperature and number of drying rolls. Also, the five-ply paperboard with the uniformly dispersed wax and resin in the outer two layers is fused by the heat of the dry rolls to aid in uniting the fibers together and the layers are further bonded together by the compressing action of the drying rolls.

It will be apparent from the foregoing that the process and apparatus involved is not limited to the making of the multi-ply paper. The above-described features which afford advantages in the process prior to and including the forming of the web on the cylinders are obviously equally effective without the addition of other sheets or webs to form a multi-ply paperboard as in the described instance.

The sheet or web after passing through the dryer rolls (not shown) is then passed through a calender stack having a plurality of rolls as, for example, 50, 51 and 52, the center roll 51 being rotated at a higher speed than the other rolls and the paper strip 48 preferably passing over and downwardly around the roll 50 and rearwardly around the roll 51 and then forwardly from between the rolls 51 and 52. The calender rolls are heated as in conventional practice and urged toward one another to press the paper therebetween. The wax-containing layers provide the surface 53 which is engaged by the calender roll 51 to particularly calender said surface 53.

The calendered surface of the wax-containing layers is preferably treated to make same slip-resistant to facilitate handling and stacking of the paperboard and products made therefrom. It is preferred that the treatment be imparted to the paper during the calendering thereof. A water box 54 is arranged adjacent the roll 51 whereby said box 54 is above the paper sheet as it leaves the calender stack. The water box is elongate, preferably being of substantially the same length as the roll or slightly longer than the sheet is wide. The water box 54 has a bottom wall 55 and front wall 56 spaced from the roll 51 and end walls 57 whereby the box cooperates with the roll 51 to form a closed ended trough 58 that is open toward the roll 51 for applying treating material to said roll. A suitable mixture of treating material preferably consists of discrete particles of granular material, such as diatomaceous earth having a particle size of 1 to 10 microns and being such that 95 percent of said material will pass through a screen of 325-mesh. However, the granular material may be of a size that the particles will pass through screens of from 250- to 400-mesh. The granular material is mixed with water preferably in a ratio of 1 pound of granular material to 1 gallon of water and thoroughly agitated to place the granular particles in suspension in the water as it is delivered through a duct 59 to the trough of the water box 54. The mixture of diatomaceous earth and water is preferably maintained at a level in the trough of the water box as regulated by an overflow 60 whereby excess of the mixture is drained therefrom. It is also preferable that the overflow or excess mixture be returned to the supply and circulation be maintained to aid in keeping the granular material in suspension in the water. To further aid in maintaining said suspension, the mixture is agitated in the trough of the water box, as, for example, by supplying compressed air from a suitable source at from 30 to 50 pounds per square inch pressure, said air being supplied through a duct 61 to a jet tube 62 that extends lengthwise of the water box trough and has jet apertures therein for directing jets of air both toward the roll 51 and the front wall 56 of the water box. As the rolls of the calender stack are rotated, the mixture of granular material and water from the water box 54 is applied to the roll 51 and moves upwardly on the periphery 63 thereof and is applied to the surface 53 of the paper whereby the discrete particles of granular material are dispersed and embedded into the surface 53 of said paper.

The discrete particles of granular material are spaced on the surface of the paper whereby the slip resistance, as expressed in degree of angle of inclination at which such paper with the treated surfaces being placed together will slide, is approximately 25 degrees. Also, the calendered surface of the wax-containing layers, when treated with the granular material as described, has a surface that may be printed satisfactorily as in the printing of corrugated board and the like used in containers. A suitable paperboard manufactured in accordance with the described process is found to have a Mullen test of between 105 and 130 with a board having a caliper of .021 to .022 and a weight per square foot of 75 to 80 pounds where the paper has a moisture content of 5 to 8 percent. This paperboard has particularly improved moisture-resistant properties and high wet-strength characteristics when formed into corrugated board and, therefore, is particularly applicable for containers of food products and the like that are subjected to high moisture conditions, particularly in cooling operations.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A process of making moisture-resistant paper from wax paper waste, said process comprising, the comminution of wax paper waste into wax paper fibers capable of passing through a ¼-inch to 2 inch screen, combining wax paper fibers and paper fibers to form a papermaking stock having a wax constituent of 6 percent to 12 percent by weight, adding water to said paper-making stock to form an aqueous mixture of approximately 1 gallon of water to 3 pounds of said stock, treating said aqueous mixture with a bleaching agent comprising tetra sodium pyro phosphate, soda ash and sodium hydrosulphite, heating said aqueous mixture during said treatment to a temperature sufficient to melt said wax constituent, disintegrating said paper stock in said aqueous mixture in a beater to form said paper stock into paper pulp in suspension in the water while heating same to a temperature above the melting point of said wax, mixing a paper sizing agent and diatomaceous earth into said suspension to achieve a uniform distribution therein, fixing the wax to the fibers of the paper pulp by adding aluminum sulphate to said suspension in the beater, forming a web from said paper pulp on a screen while maintaining the temperature approximately the melting point of said wax, compressing and drying said web into wax-containing paper sheet, calendering said sheet to smooth the surface thereof, and applying discrete particles of granular material in dispersed relation to one surface of said sheet and embedding said granular material therein during the calendering to make said sheet surface slip resistant.

2. A process of making moisture-resistant paper from wax and resin paper waste, said process comprising, the comminution of wax and resin paper waste into wax and resin paper fibers capable of passing through a ¼-inch to 2 inch screen, combining wax and resin paper fibers and paper fibers to form a papermaking stock having a wax constituent of 6 to 10 percent by weight and a resin constituent of not more than 2 percent by weight, adding water to said papermaking stock to form an aqueous mixture of approximately 1 gallon of water to 3 pounds of said stock, treating said aqueous mixture with a bleaching agent, heating said aqueous mixture during said treatment to a temperature sufficient to melt said wax constituent, disintegrating said paper stock in said aqueous mixture in a beater to form said paper stock into paper pulp in suspension in the water while heating same to a temperature above the melting point of said wax, fixing the wax and resins to the fibers of the paper pulp by adding aluminum sulphate to said suspension in the beater, forming a sheet from said paper pulp suspension on a screen while maintaining the temperature approximately the melting point of said wax, applying layers of paper fibers to one surface of said sheet, compressing and drying said sheet and layers into a composite sheet having wax- and resin-containing layers on the other surface thereof, and calendering said sheet to smooth the surfaces thereof.

3. A process of making moisture-resistant paper from wax paper waste, said process comprising, the comminution of wax paper waste into wax paper fibers capable of passing through a ¼-inch to 2-inch screen, combining wax paper fibers and paper fibers to form a papermaking stock having a wax constituent of 6 to 12 percent by weight, adding water to said papermaking stock to form an aqueous mixture of approximately 1 gallon of water to 3 pounds of said stock, treating said aqueous mixture with a bleaching agent, heating said aqueous mixture during said treatment to a temperature sufficient to melt said wax constituent, maintaining said treatment for a period sufficient for bleaching said fibrous material, disintegrating said paper stock in said aqueous mixture in a beater to form said paper stock into paper pulp in suspension in the water while heating same to a temperature apove the melting point of said wax, mixing approximately 2.75 percent diatomaceous earth into said suspension to achieve a uniform distribution therein, said proportion being by weight relative to the dry weight of the fibrous pulp, fixing the wax to the fibers of the paper pulp by adding approximately 5.5 percent aluminum sulphate to said suspension in the beater, said percentage being by weight relative to the dry weight of the fibrous pulp, further refining said paper pulp by passing same through a Jordan, forming a sheet from said paper pulp suspension on a screen while maintaining the temperature approximately the melting point of said wax, applying layers of paper fibers to one surface of said sheet, compressing and drying said sheet and layers into a composite sheet having wax-containing layers on the other surface thereof, calendering said sheet to smooth the surfaces thereof, and applying discrete particles of diatomaceous earth having a particle size of 1 to 10 microns in dispersed relation to the surface of the wax-containing layers of said sheet and embedding said particles therein during the calendering to make said wax-containing layer surface slip resistant.

4. A process of making moisture-resistant paper from wax and resin paper waste, said process comprising, the comminution of wax and resin paper waste into wax and resin paper fibers capable of passing through a ¼-inch to 2-inch screen, combining wax and resin paper fibers and paper fibers to form a papermaking stock having a wax constituent of 6 to 10 percent by weight and a resin constituent of not more than 2 percent by weight, adding water to said papermaking stock to form an aqueous mixture of approximately 1 gallon of water to 3 pounds of said stock, treating said aqueous mixture with a bleaching agent comprising approximately .25 percent tetra sodium pyro phosphate, 1 percent soda ash and 2 percent sodium hydrosulphite the proportions being by weight relative to the weight of the papermaking stock, heating said aqueous mixture during said treatment to a temperature sufficient to melt said wax constituent, maintaining said treatment for a period sufficient for bleaching said fibrous material, disintegrating said paper stock in said aqueous mixture in a beater to form said paper stock into paper pulp in suspension in the water while heating same to a temperature above the melting point of said wax, mixing approximately .625 percent mersize and 2.75 percent diatomaceous earth into said suspension to achieve a uniform distribution therein, said proportions being by weight relative to the dry weight of the fibrous pulp, fixing the wax and resins to the fibers of the paper pulp by adding approximately 5.5 percent aluminum sulphate to said suspension in the beater, said percentage being by weight relative to the dry weight of the fibrous pulp, further refining said paper pulp by passing same through a Jordan, forming a sheet from said paper pulp suspension on a screen while maintaining the temperature approximately the melting point of said wax, applying layers of paper fibers to one surface of said sheet, compressing and drying said sheet and layers into a composite sheet having wax- and resin-containing layers on the other surface thereof, calendering said sheet to smooth the surfaces thereof, and applying discrete particles of diatomaceous earth having a particle size of 1 to 10 microns in dispersed relation to the surface of the wax-containing layers of said sheet and embedding said particles therein during the calendering to make said wax-containing layer surface slip resistant.

5. A process of making moisture-resistant paper from wax paper waste, said process comprising, the comminution of wax paper waste into wax paper fibers capable of passing through a ¼-inch to 2 inch screen, combining wax paper fibers and paper fibers to form a papermaking stock having a wax constituent of 6 percent to 12 percent by weight, adding water to said papermaking stock to form an aqueous mixture of approximately 1 gallon of water to 3 pounds of said stock, treating said aqueous mixture with a bleaching agent, heating said aqueous mixture during said treatment to a temperature sufficient to melt said wax constituent, disintegrating said paper stock in said aqueous mixture in a beater to form said paper stock into paper pulp in suspension in the water while heating same to a temperature above the melting point of said wax, mixing a paper sizing agent and diatomaceous earth into said suspension to achieve a uniform distribution therein, fixing the wax to the fibers of the paper pulp by adding aluminum sulphate to said suspension in the beater, forming a web from said paper pulp on a screen while maintaining the temperature approximately the melting point of said wax, compressing and drying said web into a wax-containing paper sheet, calendering said sheet to smooth the surface thereof, and applying discrete particles of granular material in dispersed relation to one surface of said sheet and embedding said granular material therein during the calendering to make said sheet surface slip resistant.

References Cited in the file of this patent

UNITED STATES PATENTS

| | | |
|---|---|---|
| 936,106 | Finkelstein | Oct. 5, 1909 |
| 1,576,994 | Plumstead | Mar. 16, 1926 |
| 1,659,401 | Kirschbraun | Feb. 14, 1928 |
| 1,753,690 | Brown | Apr. 8, 1930 |
| 1,986,341 | Hill | Jan. 1, 1935 |
| 2,211,138 | Lewis | Aug. 13, 1940 |
| 2,236,900 | Greider | Apr. 1, 1941 |
| 2,488,515 | Sherman | Nov. 15, 1949 |